(12) United States Patent
Schoen et al.

(10) Patent No.: US 7,321,969 B2
(45) Date of Patent: Jan. 22, 2008

(54) SECURE INSTANT MESSAGING SYSTEM USING INSTANT MESSAGING GROUP POLICY CERTIFICATES

(75) Inventors: Isadore Schoen, Burke, VA (US); Michael Boberski, McLean, VA (US)

(73) Assignee: Entrust Limited, Ottawa, Ontario (CA)

( * ) Notice: Subject to any disclaimer, the term of this patent is extended or adjusted under 35 U.S.C. 154(b) by 824 days.

(21) Appl. No.: 10/133,050

(22) Filed: Apr. 26, 2002

(65) Prior Publication Data
US 2003/0204720 A1 Oct. 30, 2003

(51) Int. Cl.
H04L 9/00 (2006.01)

(52) U.S. Cl. .............. 713/153; 713/156; 726/12
(58) Field of Classification Search .......... 713/201, 713/153, 156; 726/3
See application file for complete search history.

(56) References Cited

U.S. PATENT DOCUMENTS

| | | | |
|---|---|---|---|
| 6,023,510 A | 2/2000 | Epstein | |
| 6,151,620 A | 11/2000 | Madsen et al. | |
| 6,154,463 A | 11/2000 | Aggarwal et al. | |
| 6,175,619 B1 | 1/2001 | DeSimone | |
| 6,212,548 B1 | 4/2001 | DeSimone et al. | |
| 6,215,877 B1* | 4/2001 | Matsumoto | 380/277 |
| 6,301,609 B1 | 10/2001 | Aravamudan et al. | |
| 6,330,243 B1 | 12/2001 | Strandberg | |
| 6,336,133 B1 | 1/2002 | Morris et al. | |
| 6,415,318 B1* | 7/2002 | Aggarwal et al. | 709/206 |
| 6,510,513 B1* | 1/2003 | Danieli | 713/156 |
| 6,584,564 B2* | 6/2003 | Olkin et al. | 713/152 |
| 6,604,133 B2* | 8/2003 | Aggarwal et al. | 709/206 |
| 6,760,580 B2* | 7/2004 | Robinson et al. | 455/412.2 |
| 6,769,060 B1* | 7/2004 | Dent et al. | 713/168 |
| 6,871,284 B2* | 3/2005 | Cooper et al. | 726/1 |
| 6,876,728 B2* | 4/2005 | Kredo et al. | 379/88.17 |
| 6,920,478 B2* | 7/2005 | Mendiola et al. | 709/203 |
| 6,941,149 B2* | 9/2005 | Smith et al. | 455/466 |
| 7,131,003 B2* | 10/2006 | Lord et al. | 713/168 |
| 2001/0003202 A1* | 6/2001 | Mache et al. | 713/153 |
| 2001/0003203 A1* | 6/2001 | Mache | 713/201 |
| 2002/0007398 A1* | 1/2002 | Mendiola et al. | 709/206 |
| 2002/0053020 A1* | 5/2002 | Teijido et al. | 713/153 |
| 2002/0073343 A1* | 6/2002 | Ziskind et al. | 713/202 |
| 2002/0169954 A1* | 11/2002 | Bandini et al. | 713/153 |
| 2003/0009385 A1* | 1/2003 | Tucciarone et al. | 705/26 |

(Continued)

OTHER PUBLICATIONS

DJ Adams, Programming Jabber, Dec. 2001, O'Reilly, sections 4.13, 6.3, accessed through Safaribooksonline.com.*

(Continued)

Primary Examiner—Nasser Moazzami
Assistant Examiner—David Garcia Cervetti
(74) Attorney, Agent, or Firm—Vedder, Price, Kaufman & Kammholz, P.C.

(57) ABSTRACT

A method and apparatus for facilitating instant messaging utilizes a secure instant message group policy certificate issued by an instant messaging public key infrastructure policy certificate issuing unit. The secure instant messaging group policy certificate is received, such as through a local instant messaging secure public key infrastructure proxy, and contains data defining the group members, references to other groups, security controls and relevant data such as allowed algorithms. The secure instant messaging group policy certificate defines a plurality of different instant messaging groups, each identified by an instant messaging group identifier. Each instant messaging group identifier is associated with a plurality of instant message group number identifiers.

12 Claims, 12 Drawing Sheets

U.S. PATENT DOCUMENTS

| | | | |
|---|---|---|---|
| 2003/0018726 A1* | 1/2003 | Low et al. | 709/206 |
| 2003/0021416 A1* | 1/2003 | Brown et al. | 380/277 |
| 2003/0172122 A1* | 9/2003 | Little et al. | 709/207 |
| 2004/0138834 A1* | 7/2004 | Blackett et al. | 702/62 |
| 2004/0168055 A1* | 8/2004 | Lord et al. | 713/156 |
| 2007/0003066 A1* | 1/2007 | Schwartz et al. | 380/286 |
| 2007/0050624 A1* | 3/2007 | Lord et al. | 713/168 |

OTHER PUBLICATIONS

Jabber, Inc. Jabber Server v1.2 Technical White Paper, Nov. 2000, Jabber, Inc.*

Jabber, Inc. Jabber Instant Messenger Release Notes, Sep. 2001, Jabber, Inc.*

Jabber Inc. WebClient 1.2 Administration Guide, Mar. 2002, Jabber, Inc.*

Jabber, Inc, Jabber.com Releases New Secure, Enterprise Quality Jabber Instant Messenger v1.7, Apr. 19, 2001, <http://web.archive.org/web/20010609180346/www.jabber.com/news/release_041901.shtml>.*

IT World, Jabber Adds Encryption Instant Messaging, Apr. 19, 2001, <http://security.itworld.com/4361/IDG010419jabber/pfindex.html>.*

Peter Saint-Andre, Let There Be Jabber, Aug. 15, 2001, Linux Magazine, <http://www.linux-mag.com/index2.php?option=com_content&task=view&id=827&Itemid=2235&pop=1&page=0>.*

Jabber, Inc., JCP Express Server Administration Guide, Nov. 2001, Jabber, Inc.*

Verisign, VeriSign and bantu Form Partnership to Provide Certificate-Based Secure Instant Messaging Solution, Jul. 2001, <http://www.verisign.com/verisign-inc/news-and-events/news-archive/us-news-2001/page_2003121709383313.html>.*

Jabber, Inc, JIM—Windows, Jun. 23, 2001, Jabber, Inc., <http://web.archive.org/web/20010623221614/www.jabber.com/products/jabberim.shtml>.*

Sam Costello, Jabber eyes the enterprise, sets out to encrypt IMs, Apr. 19, 2001, InfoWorld, <http://www.infoworld.com/articles/hn/xml/01/04/19/010419hnjabber.html>.*

Day, M. et al.; Instant Messaging/Presence Protocol Requirements; The Internet Society; 2000; pp. 1-26.

Day, M. et al.; A Model for Presence and Instant Messaging; The Internet Society; 2000; pp. 1-16.

* cited by examiner

SECURE INSTANT MESSAGING SYSTEM USING INSTANT MESSAGING GROUP POLICY CERTIFICATES

BACKGROUND OF THE INVENTION

The invention relates generally to instant messaging systems and methods, and more particularly to secure instant messaging methods and devices.

Instant messaging communication systems have been available for many years and are used with wireless and non-wireless devices. Instant messaging is sometimes referred to as near real time text messaging from a sender (buddy) to a receiver (buddy) or chat room. This is physically accomplished using dedicated instant messaging servers. Accordingly, instant messaging is typically used for sending small, simple messages that are delivered immediately to online users. Various instant messaging vendors typically have differing non-standard and non-interoperable protocols. For example, there are several available commercial instant messaging client applications such as offered by AOL, Microsoft, and other vendors. Moreover, such instant messaging clients do not typically provide adequate information security, nor authentication mechanisms to help provide assurance of the identity of the sender of an instant message. In addition, such products typically do not provide a mechanism to help insure that an instant message conversation between or among buddies has not been redirected or hijacked.

Businesses and government entities are often very concerned about such products since their use is becoming more prevalent but do not provide the requisite security to facilitate communication of business related information that may be sensitive, or other important information wherein a sender may need to be verified by recipient.

In an attempt to overcome the problem with non-interoperability among differing instant messaging clients, one solution has been to provide a new instant messaging client that replaces the vendor installed instant messaging client to in effect bypass the previously installed vendor's instant messaging client. The new instant messaging client may interface with different instant messaging services such as the instant messaging servers of differing instant messaging providers to attempt to effect an interoperable instant messaging communication system among differing instant messaging vendors. Moreover, such replacement instant messaging clients typically replace or supplant the currently installed instant messaging client and do not allow advertisements and other information considered valuable to the instant messaging client vendors, to pass through for access by a user of the wireless or non-wireless instant messaging device.

In addition, such solutions have attempted to provide some security. For example, such replacement instant messaging clients may provide symmetric key encryption of instant messages when an instant message is initiated. However, such systems may use a password as a key which requires the password to be sent in band or out of band to other buddies. Such a system can be susceptible to attack. In addition, such systems can typically be difficult to deploy and can be effectively non-scaleable since the instant messaging buddies have to share the password with multiple people. Sharing passwords with multiple participants increases the likelihood of a breach in security. In addition, such systems do not typically allow the digital signing of instant messages since digital signature is an asymmetric cryptographic process. Accordingly, received messages cannot be verified as to whether or not a trusted sender actually sent the information. As such, replacement instant messaging clients may offer unsuitable disadvantages.

Also known are instant messaging proxy software applications that serve as a proxy to the instant messaging client executing on a client device. For example, instant messaging parental control proxy applications have been developed that serve as a proxy to a vendor's instant messaging client that is running on a client device, also referred to as an instant messaging originator or instant messaging recipient. Such proxies scan plain text messages and typically replace inappropriate words with "XX's" so that the recipient buddy cannot read the inappropriate wording through the instant messaging client when the instant messaging client renders the instant message for display. Such parental control proxies do not typically secure any instant message traffic but simply serve as a type of content scanner.

Also in instant messaging systems, are server side proxies that execute software applications that log instant messages in a database. As such, a record of an instant messages sent by an originator or received by an instant messaging recipient may be kept in a server and sent offsite for storage. Such instant messaging logging servers typically do not encrypt the instant messages nor do they provide a digital signature of the logs to prevent tampering or provide time stamping in connection with digital signatures to thwart tampering. As a result, the security of instant messaging communication may not be suitably protected for business or government operations.

Virtual private networks (VPN) are known which use a public key infrastructure (PKI) to identify participants in the VPN. Use of such public key techniques is well known in the art. VPN's typically use Diffie-Hellman to establish secure communications. After secure communications are established using Diffie-Hellman, a number of symmetric keys are exchanged for the purposes of secure communications over the VPN. Identification of participants in the VPN is accomplished using public key cryptographic techniques. However, virtual private networks do not provide public key based encryption of instant message payload data nor do they end-to-end public key-based encryption (e.g., IM client to IM client) for instant messaging. Accordingly, instant messages may be sent in clear text form or a symmetrically encrypted form to virtual private networks and from VPNs to other networks or devices thereby potentially allowing the instant messages to be intercepted and modified or detected.

Also, it is known in the art of public key cryptography to use attribute certificates as policy certificates to control desktop cryptographic operations to centrally control multiple clients to perform the same types of encryption, decryption, digital signing and signature verification operation and other operations. For example, policy certificates may be issued through a certification authority for a plurality of clients such that all clients in a company or organization are required to use the same encryption algorithm and the same cryptographic key lengths. Other policies or rules regarding the saving of documents and the encryption of information may also be dictated by policy control information embedded in a policy certificate. Such policy certificates allow a central location or computer to enforce security policies. However, instant messaging systems are not known to provide public key based security and do not typically provide centrally controllable and dynamically configurable security operation nor public key based policy certificate control of instant messaging originators or recipients.

With respect to instant messaging, it is known that instant messaging buddy lists can be set up so that an instant message from a subscriber not on the buddy list will not be allowed to communicate with another subscriber unless they are on the same buddy list. For example, the instant messaging client may drop or block an instant message from non-buddies. However, this buddy list configuration is typically configured by each individual subscriber. Generally, there is no ability to centrally replace or control groups of instant message users. Moreover, a problem arises where it may be desirable to override a buddy list in the event of an emergency. For example, it may be desirable to immediately communicate with specific instant messaging subscribers at one time in the event of an emergency. However, this would require each individual to modify their buddy list. In addition, known buddy lists are not secure and as such can potentially be modified, thereby an attacker can add or delete false buddies to intercept messages.

Accordingly, a need exists for the instant messaging device and method that facilitates improved instant messaging group communication while also providing public key security if desired.

BRIEF DESCRIPTION OF THE DRAWINGS

The present invention is illustrated by way of example and not limitation in the accompanying figures, in which like references indicate similar elements, and in which:

FIG. 5 is a diagrammatic illustration of a secure buddy list in accordance with one embodiment of the invention;

DETAILED DESCRIPTION OF THE PREFERRED EMBODIMENT

Figure 1:
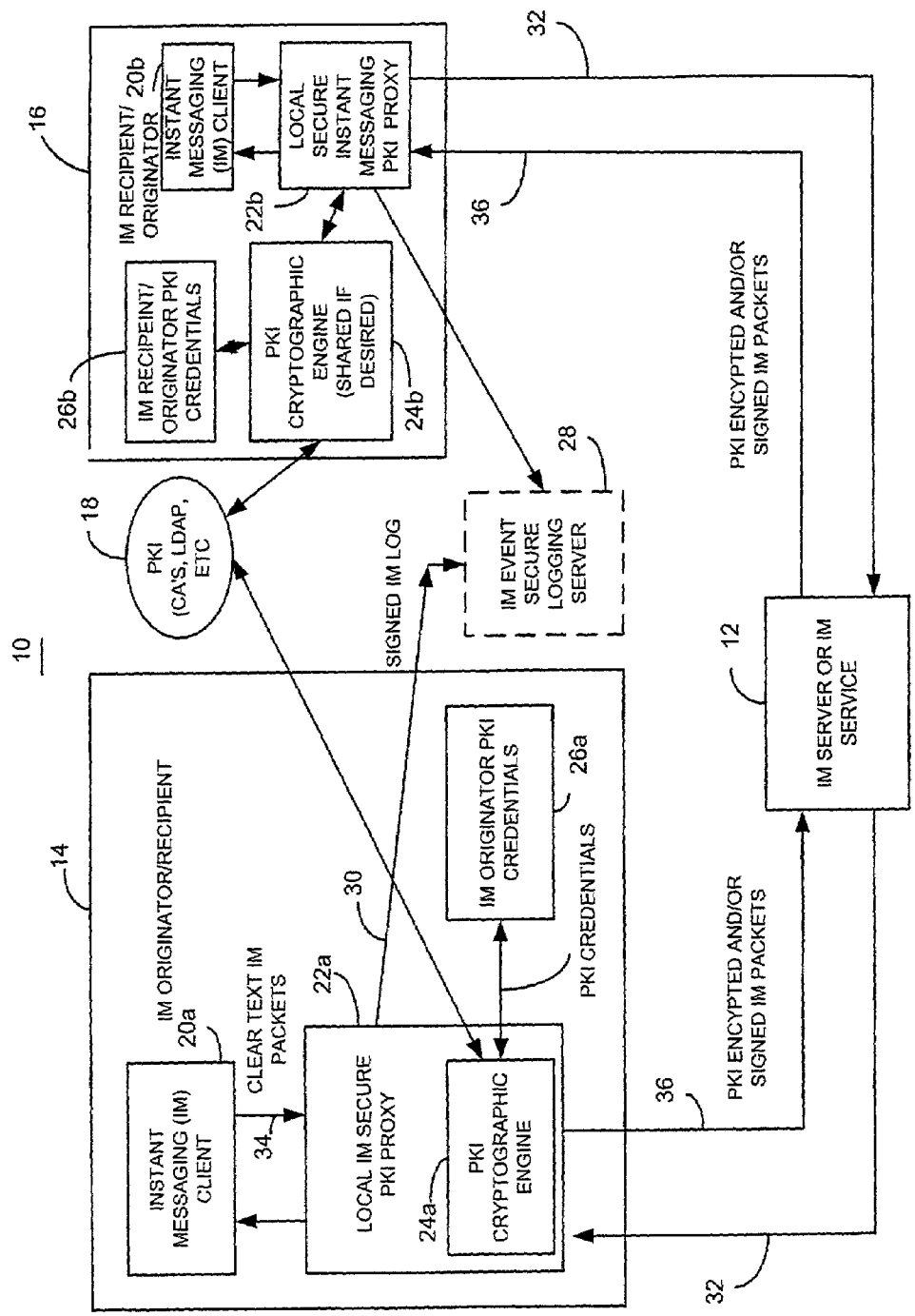
FIG. 1 is a block diagram illustrating one example of an instant messaging system in accordance with one embodiment to the invention.

Briefly, a method and apparatus for facilitating instant messaging utilizes a secure instant message group policy certificate issued by an instant messaging public key infrastructure policy certificate issuing unit. The secure instant messaging group policy certificate is received, such as through a local instant messaging secure public key infrastructure proxy, and contains data defining the group members, references to other groups, security controls and relevant data such as allowed algorithms. The secure instant messaging group policy certificate defines a plurality of different instant messaging groups, each identified by an instant messaging group identifier. Each instant messaging group identifier is associated with a plurality of instant message group number identifiers. In one embodiment, an instant message subscriber called the state manager that has been designated by the instant messaging public key infrastructure policy certificate issuing unit utilizes their digital signing key to digitally sign an instant message as a state change notification to effect a change in operational state of the instant messaging secure PKI proxy. The instant messaging group policy certificate may then be signed by an instant message public key infrastructure policy certificate issuing unit as trusted by the potential group members identified in the certificate. The secure instant messaging group policy certificate therefore includes an identifier such as including a distinguished name and optionally an e-mail address of the state manager, or any other suitable identifying information. The state manager is an administrator authorized to change the operation of a system comprised of individual secure instant messaging public key infrastructure proxies.

One form of instant messaging public key infrastructure policy certificate may be the instant messaging group policy certificate. As with other instant messaging policy certificates, it may be initiated through trusted group administrators and may be published to a repository or broadcast to active clients as described above. As operating conditions change, new certificates may be published. At the option of the administrator, all active instant messaging subscribers may be notified that a new certificate is available. The instant messaging public key infrastructure policy certificate interpreter evaluates the certificate and causes the instant messaging originators to immediately apply the new policy rules to all operations.

In the event of an emergency situation or on a periodic basis if desired, the state manager may issue a secure instant message state change notification to effect the change to a group of instant messaging subscribers. The change effectively overrides any previous buddy lists or secure group buddy lists used by the respective instant messaging devices. The secure instant message state change notification may be in the form of a digitally signed instant message containing a distinguished name identifier associated with the state change manager. Any other identifying information may also be used.

Also, a method and apparatus for facilitating instant messaging generates (e.g. issues) an instant messaging public key cryptography policy certificate containing selected instant messaging public key cryptography policy control information. An instant messaging device obtains the instant messaging public key cryptography policy certificate through the use of a local instant messaging secure public key infrastructure proxy. Based on instant messaging policy control data in the instant messaging public key cryptography policy certificate, operations of the local instant messaging secure PKI proxy are controlled for outgoing and incoming instant messages. Hence, among other advantages, central enforcement of security policies for instant messaging users is provided.

Also, instant messaging secure PKI proxy provides public key-based secure instant messaging by intercepting instant messages to or from an instant messaging client, such as an instant messaging client running on a client device, and applies a public key-based cryptographic operation on the intercepted instant messages using at least one of: a private key associated with an instant message originator and a public key associated with an instant message recipient to produce an end-to-end public key infrastructure secured instant message (or packet). The public key-based cryptographic operations include encrypting, decrypting, digital signing and verifying digital signatures on instant messages. As such, a public key infrastructure (PKI) is used to provide non-repudiation and public key-based encryption services for content of instant messages during an instant message session helping to insure that the information will not be disclosed to unauthorized parties and assuring that the identities of all the participants are known and trusted without impairing a resident instant messaging client.

In one embodiment, a first instant messaging secure public key infrastructure proxy executing on an instant messaging originator, such as an instant messaging device, intercepts instant messages that comes to or from the corresponding instant messaging client that is running on the instant messaging originator. Similarly, the instant messaging recipient device includes a corresponding instant messaging client application and its own copy of the local secure instant messaging public key infrastructure proxy, also referred to as the instant messaging secure PKI proxy. In one embodiment, the implementation is a local proxy, such as a software application, that interfaces with the instant messaging client provided by a vendor so that there is no need to modify features or functionality of the commercial client. The instant messaging secure public key infrastructure proxy determines the type of public key-based cryptographic operations to perform on intercepted instant messages by evaluating for example a secure buddy list that is additionally created when determining whether to encrypt an outgoing instant message. When receiving instant messages, the instant messaging secure public key infrastructure proxy analyses the instant message to evaluate the instant message type data, instant message direction data, and data within the instant message package payload to determine whether to, for example, decrypt the instant message, pass the instant message through without performing any public key-based cryptographic operation, or verifying a digital signature of the instant message.

In another embodiment, the instant message secured public key infrastructure proxy may also generate a secure instant message event log using a secure event log generator and store the secure event log (e.g., hashes of instant messages) locally for the instant message originator or instant message recipient. Alternatively, an instant message event secure logging server may be used to securely log data representing the instant message events as detected by the instant messaging secure public key infrastructure proxy.

FIG. 1 is a block diagram illustrating one example of an instant messaging system 10 in accordance with one embodiment of the invention. The instant messaging system 10 includes an instant messaging server 12 or instant messaging service as known in the art. The instant messaging server 12 is in operative communication with a plurality of instant messaging devices. For purposes of discussion, one of the instant messaging devices will be referred to as an instant messaging originator 14 which will be described as initiating an instant message while another instant messaging device 16 will be referred to as instant message recipient, although it will be recognized that either device may operate to send or received instant messages. The instant messaging system 10 also includes one or more conventional public key infrastructures 18 that provide, as known in the art, necessary certification authorities, directories, or any other suitable public key infrastructure entities or operations to provide public key-based encryption, public key-based decryption, time stamping operations, public key-based digital signatures, and public key-based verification of such digital signatures or any other desired operations.

Each of the instant messaging devices includes an instant messaging client 20a and 20b, such as a commercially available instant messaging client application distributed or sold by AOL, MSN, YAHOO or any other suitable instant messaging client vendor. Each of the instant messaging devices also includes a local instant messaging secure public key infrastructure proxy 22a and 22b which serves as an interface between the respective instant messaging client and the instant messaging server 12.

In addition, each of the instant messaging devices 14 and 16 may include public key infrastructure engines 24a and 24b, which may be for example integrated as part of the software that defines the instant messaging secure public key infrastructure proxy 22a and 22b or may be a standalone or pre-existing public key infrastructure cryptographic engine that is resident on the instant messaging device but used for other applications such as e-mails or other operations.

By way of example, the instant messaging originator and instant messaging recipients may be for example wireless or non-wireless devices such as handheld and non-handheld devices. These may include, but are not limited to, Internet appliances, PDAs, handheld telephones, laptop computers, desktop computers, televisions, or any other suitable devices that employ instant messaging.

The local instant messaging secure public key infrastructure proxies 22a and 22b are preferably implemented as software applications that are executed by one or more processing devices in the instant messaging device. However, it will be recognized that any suitable structure may be used, including, but not limited to, implementation of the instant messaging public key infrastructure proxy as hardware, a combination of hardware and software, firmware, state machines, or any other suitable combination thereof and any other suitable structure. In the case where the instant messaging secure public key infrastructure proxies 22a and 22b, or other elements are implemented as software applications, memory, such as one or more ROM's, RAM's, diskettes, CDROM's, other magnetic or optical media, distributed memory, web server memory, or any other suitable memory element(s) that contain executable instructions that cause one or more processing devices, such as DSP's, CPU's, microcontrollers, state machines, firmware, other hardware or any suitable processing device(s) to carry out the operations described herein may be used. Alternatively, any suitable combination of hardware, software and firmware may be used.

As shown with the instant messaging recipient, the public key infrastructure cryptographic engine 24b may be a shared public key infrastructure cryptographic engine shared with non-instant messaging applications if desired. The public key infrastructure cryptographic engines 24a and 24b, among other things, generate or receive the public and private key pairs used for encryption, decryption, digital signing and verification of digital signatures from the PKI 18. The private key components of the instant messaging originator public key infrastructure credentials 26a and instant messaging recipient public key infrastructure credentials 26b are preferably stored in a secured manner locally on the instant messaging device, although they may be stored on hardware tokens, smart cards or any suitable device or location. As used herein, public key credential of the instant message originator and instant message recipient include public key pairs associated with users of the instant message originator and instant message recipient.

The encryption of instant messages may also be done by encrypting the instant message with a symmetric key and then encrypt the symmetric key using public key techniques, hence creating a wrapped symmetric key.

If desired, the instant messaging system 10 may include an instant messaging event secure logging server 28 that stores an instant messaging log containing public key infrastructure secured instant message packets (or hashed values of instant messages) sent or received by the instant messaging originator 14. The instant messaging secure public key infrastructure proxy 22a uses the public key infrastructure cryptographic engine 24a to encrypt instant messages with a public encryption key of the IM recipient stored as part of the instant messaging originator public key infrastructure credentials and may also use a private signing key of the instant messaging originator to sign instant messages or the entire instant message log to prevent manipulation of previously sent or received instant messages.

As such, in one embodiment, every instant message is digitally signed by the instant messaging originator and recorded in the instant messaging log 30 which is stored in the instant messaging event secure logging server 28. Alternatively, each instant message may be digitally signed by the instant messaging originator through the instant messaging secure public key infrastructure proxy and recorded locally in an instant messaging log on each instant messaging device. The instant messaging log files can be examined and the signatures verified so that there is no dispute about the source or content of the messages at a later date.

The instant messaging originator public key infrastructure credentials 26a may include for example a private signing key of the instant messaging originator 14, a corresponding public verification key of the instant messaging originator, a private decryption key of the instant messaging originator and a public encryption key of the instant messaging originator. Likewise, the instant messaging recipient credentials 26b may include a private signing key, a public verification key, private decryption key and public encryption key associated with the instant messaging recipient 16. It will be recognized that the instant messaging recipient 16 will also serve as an instant messaging originator when sending or initiating instant messages. Therefore, the operations described with respect to instant messaging originator 14 are also be carried out by instant messaging recipient 16 when the instant messaging recipient 16 is originating an instant message.

The public key infrastructure cryptographic engines 24a and 24b, as known in the art, are operatively coupled to the public key infrastructure 18 to carry out necessary certificate validations, CRL checks, and other necessary public key infrastructure operations. Alternatively, the certificate path development operations may be done by a third party.

The local instant messaging secure public key infrastructure proxy 22a intercepts instant messages, such as incoming packets 32 sent by the instant messaging recipient (as an originator) through the instant messaging server 12 and instant messages such as clear text packets 34 sent from the instant messaging client 20a. The local instant message secure public key infrastructure proxy 22a applies a public key-based cryptographic operation, such as one of asymmetric encrypting (such as wrapping a symmetric encryption key using the public encryption key), decrypting, digitally signing, or verifying, the intercepted instant messages. For example, if outgoing clear text packets 34 need to be digitally signed, the instant messaging secure public key infrastructure proxy utilizes the public key infrastructure cryptographic engine 24a to digitally sign instant messaging packets to produce an end-to-end public key infrastructure instant message packet 36 (or complete message or a plurality of packets). As used herein, the term "instant message packet" includes one or more instant message packets and encrypting an instant message packet refers to encrypting one or more payloads of one or more packets. Also, the term "instant message" refers to one or more instant message packet.

By way of another example, if the outgoing instant messaging packets 34 are to be encrypted, the instant messaging secure public key infrastructure proxy 22a using the public key infrastructure cryptographic engine 24a performs a public key-based encryption operation on outgoing instant message packets using a public encryption key associated with the instant message recipient 16. The public encryption key of the instant messaging recipient is stored locally or obtained from the PKI as needed. The end-to-end secured instant message packet 36 is then passed by the instant messaging server 12 to the instant messaging recipient 16. Encrypted payloads are encoded using a BASE64 operation to generate a string of characters as opposed to binary numbers so that instant messaging servers can suitably pass the secure instant messaging packets through the network.

The local secure instant messaging public key infrastructure proxy 22b executing on the instant messaging recipient 16 intercepts the public key infrastructure secured instant message package 36 and analyzes the packet to determine whether to perform some type of public key-based cryptographic operation thereon. For example, the local secure instant messaging public key infrastructure proxy 22b may analyze the instant message package payload to search for a pattern of data indicating that the payload has been encrypted. If so, the local secure instant messaging public key infrastructure proxy 22b utilizes the public key infrastructure cryptographic engine to decrypt the encrypted instant messaging packets using its stored private decryption key stored as the instant messaging recipient public key infrastructure credentials 26b.

The local secure instant messaging public key infrastructure proxy 22b serves as a second instant messaging secured public key infrastructure proxy executing on the instant messaging recipient 16 that intercepts instant messages sent by the instant messaging secure public key infrastructure proxy 22a running on the instant messaging originator 14. As an instant messaging recipient, the local secure instant messaging public key infrastructure proxy 22a performs reverse public key cryptographic operation on intercepted traffic 36 from the instant messaging originator instant messaging secure public key infrastructure proxy 22a. The intercepted traffic from the instant messaging secure public key infrastructure proxy 22a is intended for the instant messaging client 20b which is associated with, such as executing on, the instant messaging recipient 16. As shown above, the reverse public key cryptographic operations include for example decrypting the intercepted public key infrastructure secured instant message packets using a private decryption key associated with the instant message recipient 16 as obtained from the instant messaging recipient credentials 26b. Alternatively, the local secure instant messaging public key infrastructure proxy 22b may perform digital signature verification by verifying a digital signature of the intercepted public key infrastructure secured instant message packet 36 using a public verification key associated with the instant message originator 14. The local secure instant messaging public key infrastructure proxy may obtain the public verification key from the intercepted public key infrastructure secured instant message packet itself or may obtain the public verification key of the instant messaging originator from the public key infrastructure 18, from a cache, from any other suitable location.

Figure 2:
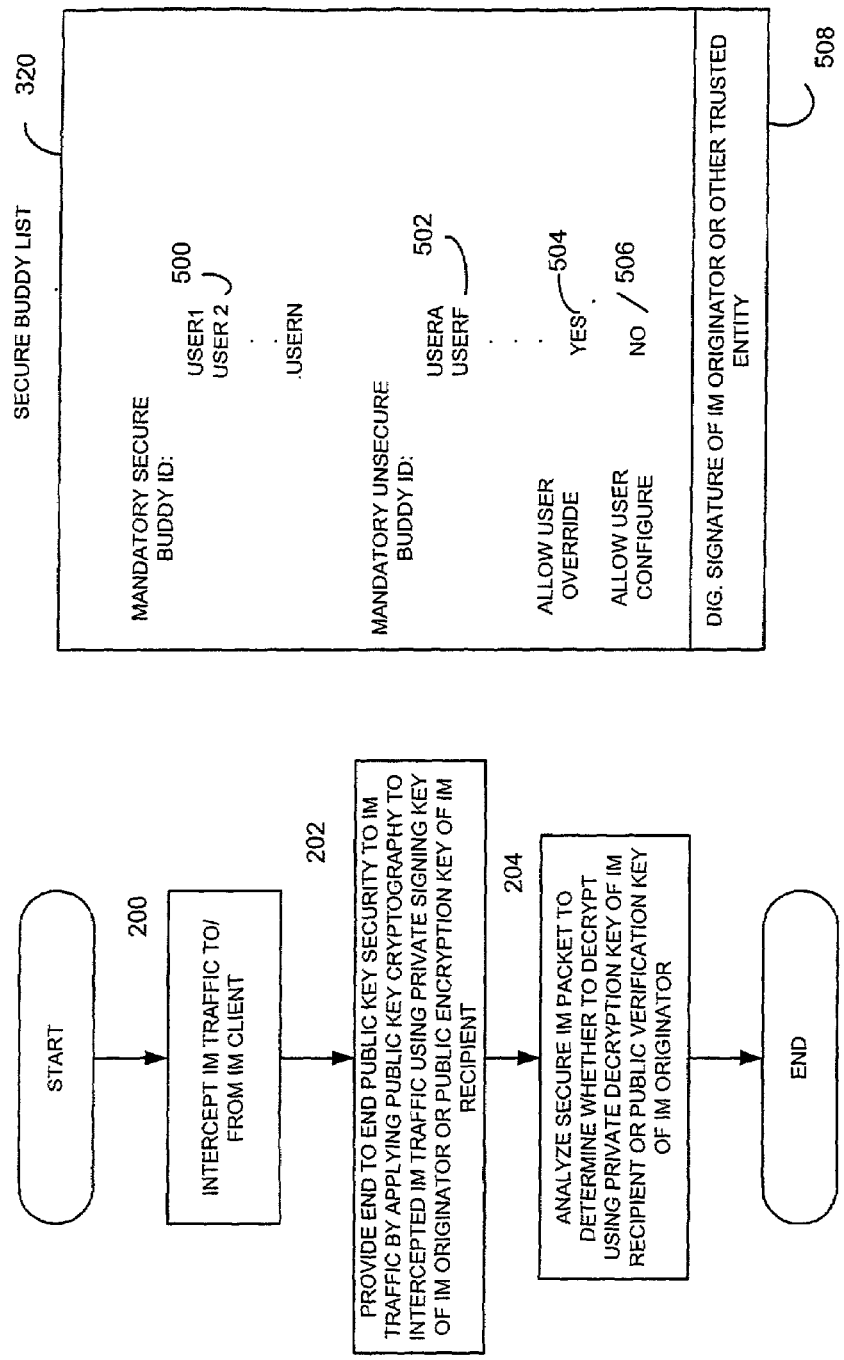
FIG. 2 is a flow chart illustrating one example of a method for facilitating instant messaging in accordance with one embodiment of the invention.

FIG. 2 illustrates a flow chart of a method for facilitating instant messaging as carried out for example by the instant messaging system 10 of FIG. 1. As shown in block 200 the method includes intercepting instant messages, such as clear text packets 34 or instant message packets 32 from the instant messaging server 12. As shown in block 202, the method includes providing end-to-end public key security to instant messages by applying public key cryptography to intercepted instant messages using a private signing key of the instant messaging originator, using a public encryption key of the instant messaging recipient or using a public verification key of the instant messaging recipient. As shown in block 204, the method includes analyzing a public key infrastructure secured instant message packet, such as by the local secure instant messaging public key infrastructure proxy 22b, to determine whether to decrypt the public key infrastructure secured instant message packet or verify a digital signature on the public key infrastructure secured instant message packet.

Figure 3:
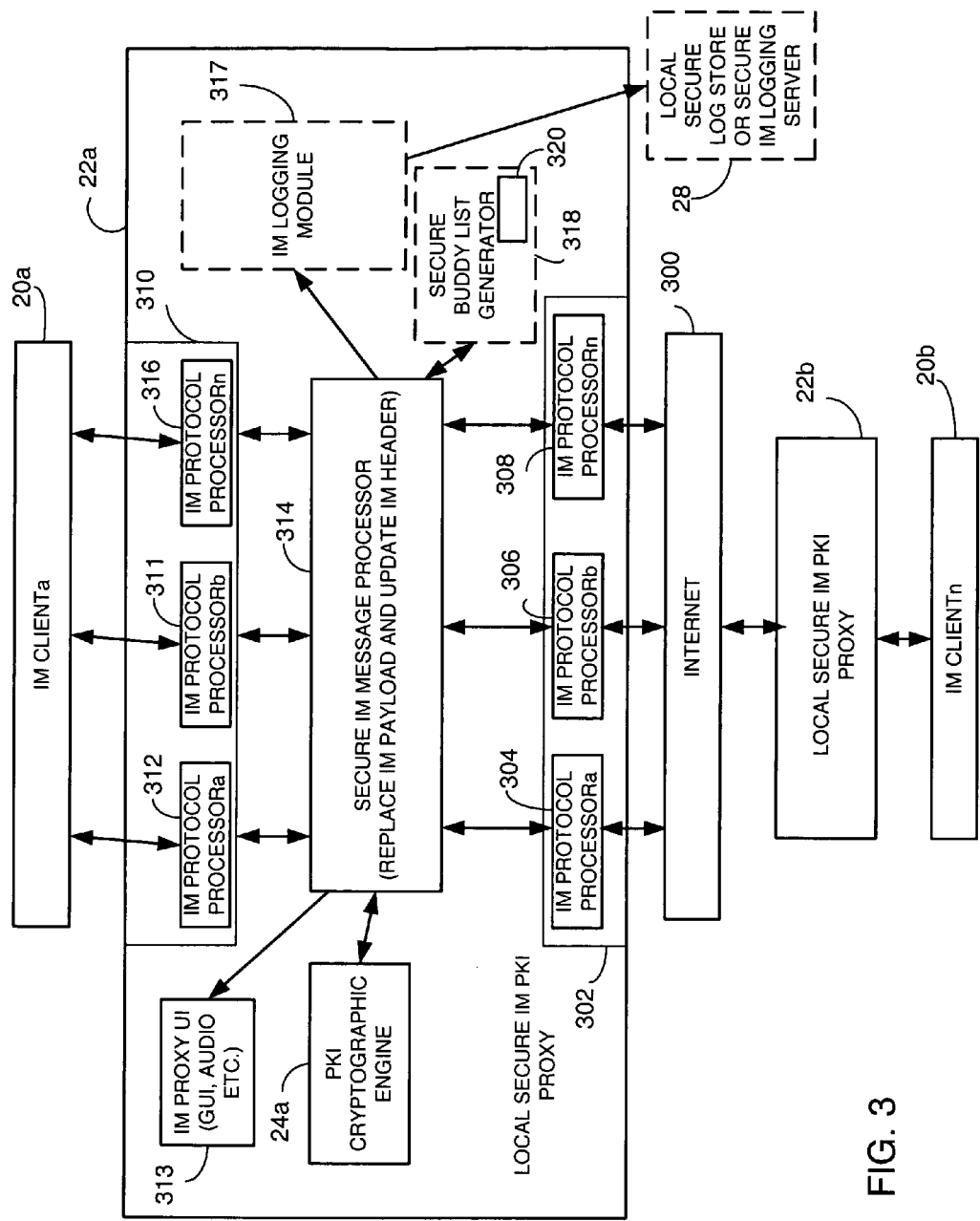
FIG. 3 is a block diagram illustrating functionally, for example, of a local secure instant messaging public key infrastructure proxy in accordance with one embodiment of the invention.

FIG. 3 is a block diagram illustrating in more detail, one embodiment of secure instant messaging public key infrastructure proxy 22a. In this example, the instant messaging devices include the respective instant messaging clients 20a and 20b and are in operative communication through the Internet 300. However, it will be recognized that any intranet or other network or combination of suitable networks may be used. As such, in this example, the instant messaging server 12 is accessible via the Internet 300.

The instant messaging secure public key infrastructure proxy 22a includes an instant messaging server interface 302 that includes a plurality of instant messaging protocol processors 304, 306 and 308. Each of the instant messaging protocol processors 304-308 analyze instant messaging headers of each packet to determine the type of protocol that the instant message is in. For example, each instant messaging client vendor may utilize its own protocol and as such instant messaging protocol processor 304 may be designated for instant message packets in a protocol associated with AOL instant messaging services, instant messaging protocol processor 306 may be designated to handle instant messages in the Microsoft instant messaging protocol, instant messaging protocol processor 308 may be designated to handle the instant messages in a protocol of yet another vendor.

As known in the art of instant messaging (which herein includes chat messaging), instant messages can be different types and data within the headers may indicate whether the instant messages are outgoing message associated with invitations, outgoing status information, or the text of the message itself. Invitations may include for example file transfers or chat group requests. Other messages such as connection messages may be passed through without any cryptographic operation being performed thereon.

The instant messaging secure public key infrastructure proxy 22a also includes an instant messaging client interface 310 which includes corresponding instant messaging protocol processors 312, 311 and 316, to interface with the IM client. The instant messaging secure public key infrastructure proxy 22a also includes an instant messaging proxy user interface 313, a secure instant messaging message processor 314, an optional messaging logging module 317, and a secure buddy list generator 318. All the blocks shown in connection with the instant messaging secure public key infrastructure proxy represent functional blocks. As such, the instant messaging protocol processors may be software modules executing on one or more processing devices, or a CPU of a handheld device or non-handheld device, or executing on multiple processors implemented in hardware or any suitable combination thereof as previously noted. The secure instant messaging processor 314 is preferably implemented as a software module and serves as a secure instant messaging payload analyzer operative to determine a type of public key-based cryptographic operation to perform on intercepted instant messages. For an initial outgoing instant message, this is done in response to evaluation of a secure buddy list 320 which is generated by a secure buddy list generator 318. The secure buddy list is analyzed on first outgoing messages to determine whether to encrypt or digitally sign outgoing instant messages. In addition, the secure instant message processor 314 evaluates incoming instant message packets to determine whether to decrypt or verify the incoming instant message. This may be done for example by analyzing the instant message type information to see the type of message. For example, if the message type is a connection message, no decryption or verification is necessary. If the incoming message is designated as an outgoing instant message, which can be determined by the source and destination IP ports and addresses. In addition, the instant message payload is analyzed to determine whether for example the beginning of the payload begins with a predetermined text sequence. If the predetermined text sequence is embedded in the payload, the secure instant message processor 314 engages the public key infrastructure cryptographic engine to perform decryption to see if the received instant message is of an expected type. Hence, the public key-based cryptographic engine is selected to perform the selected type of public key-based cryptographic operation on the intercepted instant messages based on an analysis of the instant message packet.

Figure 4:
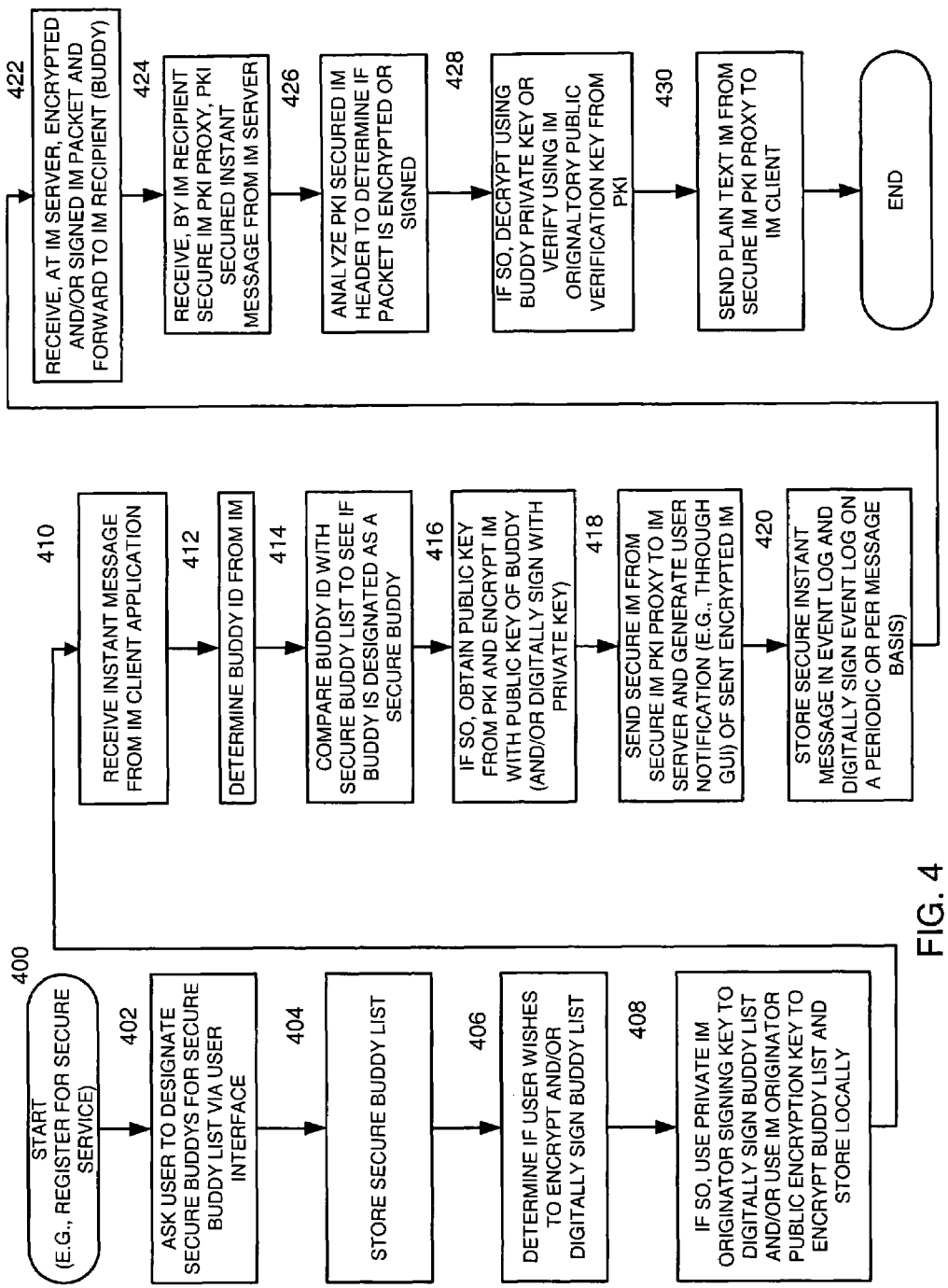
FIG. 4 is a flow chart illustrating one example of a method for facilitating instant messaging in accordance with one embodiment of the invention.

Referring also to FIG. 4, which is a flow chart illustrating an example of a method for facilitating instant messaging, in operation, instant message users register for the secure instant messaging service described herein. By becoming registered members, they become a client of the public key infrastructure. Alternatively, the local secure instant messaging public key infrastructure proxy downloaded onto a client unit may be used to register with a suitable certification authority or other public key infrastructure entity as known in the art. This is shown in block 400. As a result, a buddy identifier is maintained by the PKI for each member. As shown in block 402, the method includes providing a user interface, by generating a user interface 313 through the instant messaging proxy 22a so that a user may select a desired group of buddies for designation on the secured buddy list. For example, a graphic user interface may be presented with blank fields for a user to type a buddy identifier (e.g., name or email address) and to designate whether or not that buddy should receive and send encrypted information and/or signed information. The information input by the user is then recorded in a database or file by the secure buddy list generator 318. Once the user has completed entering this buddy identification data for buddies that are to be communicated with securely via public key infrastructure cryptography, the buddy list may be digitally signed by the local secure instant messaging secure public key infrastructure proxy to form the secure buddy list 320 which may then be stored locally. Since it is signed, a list of secure buddies cannot be modified or tampered with. The buddy identifiers are also used by the public key infrastructure cryptographic engine 24a to obtain requisite public encryption key certificates (or just the keys if desired) from the public key infrastructure 18. This may be done for example through an LDAP attribute entry wherein upon registration, members enter their buddy IDs to the public key infrastructure so that upon subsequent inclusion on respective buddy lists, the local public key infrastructure cryptographic engines may obtain the suitable public keys for use in encrypting messages or verifying digital signatures for identified secure buddies. The secure buddy list described herein is generated in addition to the buddy list maintained by the instant messaging client 20a and as such is transparent to the instant messaging client buddy list.

As shown in block 404, once the buddy list IDs have been entered, or the buddies have been selected by the user, the secured buddy list is generated and stored. As shown in block 406, as part of this operation, the method includes determining if the user wishes to encrypt and/or digitally sign the buddy list by presenting the user with an interface screen so that the user may select a GUI button for example that the buddy list should be digitally signed and secured. If so, as shown in block 408, the secure instant message processor 314 uses the private instant messaging originator signing key to digitally sign the buddy list to create the secure buddy list and/or use the instant messaging originator public encryption key to encrypt the buddy list and store it locally. Hence, the secure buddy list generator 318 generates a secure buddy list 320 that identifies instant message buddies that are designated as parties for which end-to-end public key infrastructure cryptographic operations are to be applied to their associated instant messages.

As shown in block 410, the method includes receiving an instant message from an instant messaging client application for communication to an instant messaging recipient. As shown in block 412, the method includes determining the buddy identifier from the instant message and as shown in block 414, comparing the buddy ID from the instant message from the buddy IDs listed in the secure buddy list to see if the buddy is designated as a secure buddy. If so, as shown in block 416, the method includes obtaining the public key from the public key infrastructure 18 and encrypting the outgoing instant message packets with the public key of the buddy ID in the secured buddy list. Alternatively, where a digital signature is to be applied, the method includes digitally signing the instant message for the buddy in the secure buddy list using the private signing key of the instant messaging originator.

As shown in block 418, the method includes sending the end-to-end public key infrastructure secured instant message packet from the secure instant messaging public key infrastructure proxy to the instant message server and generating user notification using the instant messaging proxy user interface 312 to notify the user that an encrypted instant message has been sent.

As shown in block 420, the method includes digitally signing, using a private signing key of the instant messaging originator or of another trusted authority, the instant messaging event log containing public key infrastructure secured instant message packets that were sent or received by the messaging originator. This may be done on a per message or other time interval basis. Also, a running hash may be calculated and periodically signed. The signed hash is then written to the log file.

As shown in block 422, the method includes receiving, at the instant messaging server, the end-to-end public key infrastructure secured instant message packet and forwarding the packet to the appropriate instant messaging recipient. As shown in block 424, the method includes receiving by the instant messaging recipient, the public key infrastructure secured instant message packet from the instant messaging server and as shown in block 426, analyzing the public key infrastructure secured instant messaging header to analyze the instant message type data and instant message direction data. In addition, the instant message payload is analyzed to determine if the packet has been encrypted or signed. For example, the payload may be analyzed to see if there is MII designation indicating that the information has been BASE-64 encoded, and may be digitally signed or encrypted using a public key cryptography. If so, the payload is decoded, and the resulting binary data is analyzed to determine whether the data is encoded using Distinguished Encoding Rules (DER). DER identifies the exact security functions, algorithms, and keys used to sign or encrypt the payload.

As shown in block 428, if it is determined that the public key infrastructure secured instant messaging packet has undergone encryption or digital signing, the method includes using the buddy private key (recipient) to decrypt the message or using the public verification key of the originator to verify the digital signature of the secured instant messaging packet. Once the signature has been verified or the payload has been decrypted, the method includes, as shown in block 430, sending the plain text instant message from the secure public key infrastructure proxy to the instant messaging client. The instant messaging client then renders the instant messaging message in a conventional way.

As noted in block 420, the instant messaging logging module 316 requests from the public key infrastructure cryptographic engine to digitally sign the event log.

FIG. 5 diagrammatically illustrates an example of a secure buddy list 320 that includes data representing: mandatory secure buddies 500, mandatory unsecure buddies 502, allowance of security override by a user 504, and allowance of a user to configure the buddy list 506, along with a digital signature of an instant messaging originator or other trusted authority at 508. As such, the secure buddy list identifies the buddies only for which the instant message subscriber is allowed to communicate and how they are allowed to communicate, such as whether public key infrastructure security must be employed or unsecure securities must be employed. The secure buddy list effectively overrides the buddy list maintained by the IM client but is transparent to the IM client. As noted above, the selection of this information may be facilitated through the use of a graphic user interface or any other suitable user interface.

Figure 6:
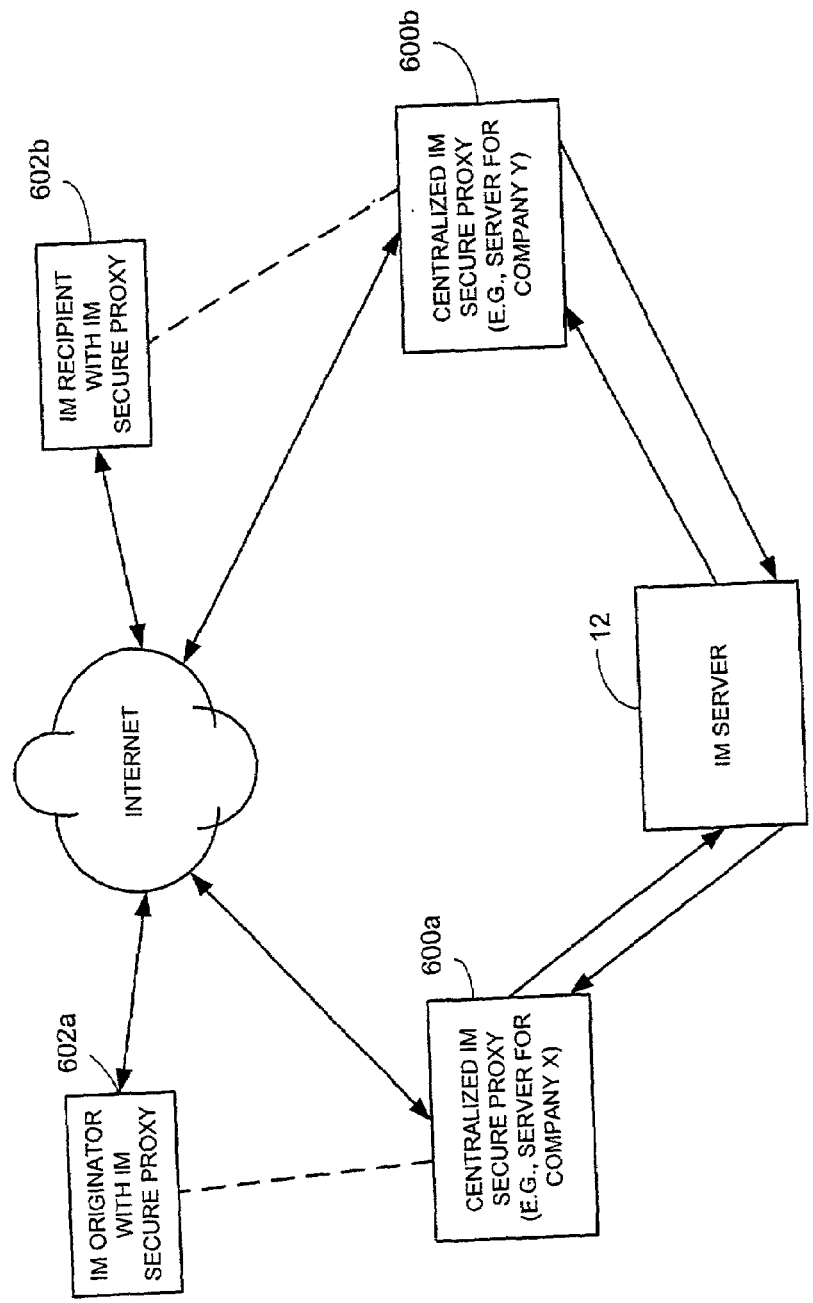
FIG. 6 is a block diagram illustrating an instant messaging system employing a centralized instant messaging secure proxy configuration in accordance with one embodiment of the invention.

Referring to FIG. 6, an alternative approach is disclosed that employs a centralized instant messaging secure proxy 600a and 600b, along with IM clients coupled to a stripped down version of the local secure instant messaging public key infrastructure proxy designated as 602a and 602b. The difference between the stripped down version of the instant messaging secure public key infrastructure proxy and the previous proxy is that less public key infrastructure overhead is required. For example, the centralized instant messaging secure proxy may perform the required certificate validation operations and CRL checks and other necessary public key infrastructure overhead operations. In this embodiment, there is a centralized instant messaging secure proxy 600a for one company and another centralized secure proxy for another company. The dashed lines indicate an alternative of direct communication between an instant messaging originator with an instant messaging secure proxy and the centralized instant messaging secure proxies. The centralized instant messaging secure proxies may be situated within firewalls of an enterprise.

The stripped down local secure instant messaging public key infrastructure proxy performs digital signing and signature verification locally, and encrypts instant messaging packets for the centralized instant messaging secure proxy 600a. The centralized instant messaging secure proxy 600a decrypts using its private decryption key and re-encrypts the instant message using a public key of the other centralized instant messaging secure proxy 600b. The centralized instant messaging secure proxy 600b decrypts and re-encrypts for the instant messaging recipient using the instant messaging recipient public key. The centralized instant messaging secure proxy 600b recognizes the recipient's buddy name and uses that name to retrieve the recipient's certificate from the LDAP directory or other PKI repository.

For example, in operation, the centralized instant messaging secure proxy 600a receives public key infrastructure encrypted instant message traffic from the instant messaging originator and decrypts the public key infrastructure encrypted message traffic using a corresponding private decryption key of the centralized instant message proxy. The centralized instant messaging secure proxy then re-encrypts the instant message traffic using a public encryption key associated with another centralized instant messaging secure proxy. The receiving instant messaging secure proxy re-encrypts the message for the recipient using the recipient's public encryption key. The instant messaging recipient uses its stripped down instant messaging secure proxy 602b to intercept the public key infrastructure re-encrypted instant messages prior to receipt by the instant messaging client. The stripped down instant messaging secure proxy applies a public key-based decryption operation on the public key infrastructure re-encrypted instant messages to produce plain text instant messages and passes the plain text instant messages to the instant messaging client for rendering.

As illustrated, an instant messaging secure public key infrastructure proxy intercepts for example all instant messages sent by, or received from, an instant messaging client application. On a sender's side, text message packets, file transfer messages, and other types of messages may be encrypted prior to their introduction to a network. Each packet or a selected set of packets may be digitally signed, permitting periodic assurance that the recipients' identities can be validated. Once processed, an instant message may be forwarded to an event log for storage where it is held for later retrieval. If encryption is employed, packets are encrypted for all recipients of the instant message and for the originator of the message; thus, the originator is able to decrypt logged transactions.

Each packet is inspected to determine whether an instant message packet contains information to be processed using a public key-based cryptographic process. If not, the instant message package is passed to the network without additional delay. If it is determined that the instant message packet contains information requiring the application of a public key-based security operation, an instant message secure public key infrastructure proxy performs the requisite public key-based cryptographic operation and in the case of encrypting or digitally signing instant messages, creates a new instant messaging packet using new header information derived from the old packet and transmits the new instant messaging packet to the instant messaging server 12. The instant messaging secure public key infrastructure proxy inspects each packet to determine whether public key-based security services have been applied or need to be applied. The instant messaging secured public key infrastructure proxy may add text to an instant message packet that provides visual indications of the results of the secure processing such as background display changes, signing the message, or other operations.

The end-to-end public key infrastructure secure instant message packets are digitally signed or encrypted and the resulting binary data is encoded into a text format. Accordingly, a public key infrastructure secure instant message packet is displayable by a conventional instant messaging client that does not have an intermediate instant messaging secure public key infrastructure proxy. If desired, the intermediate local secure public key infrastructure proxy may provide a message to the user via a suitable user interface such as a display screen or an audio output, indicating that a sender is attempting to establish a secure connection. The recipient may notify the sender that a secure connection is not possible, if desired.

Figure 7:
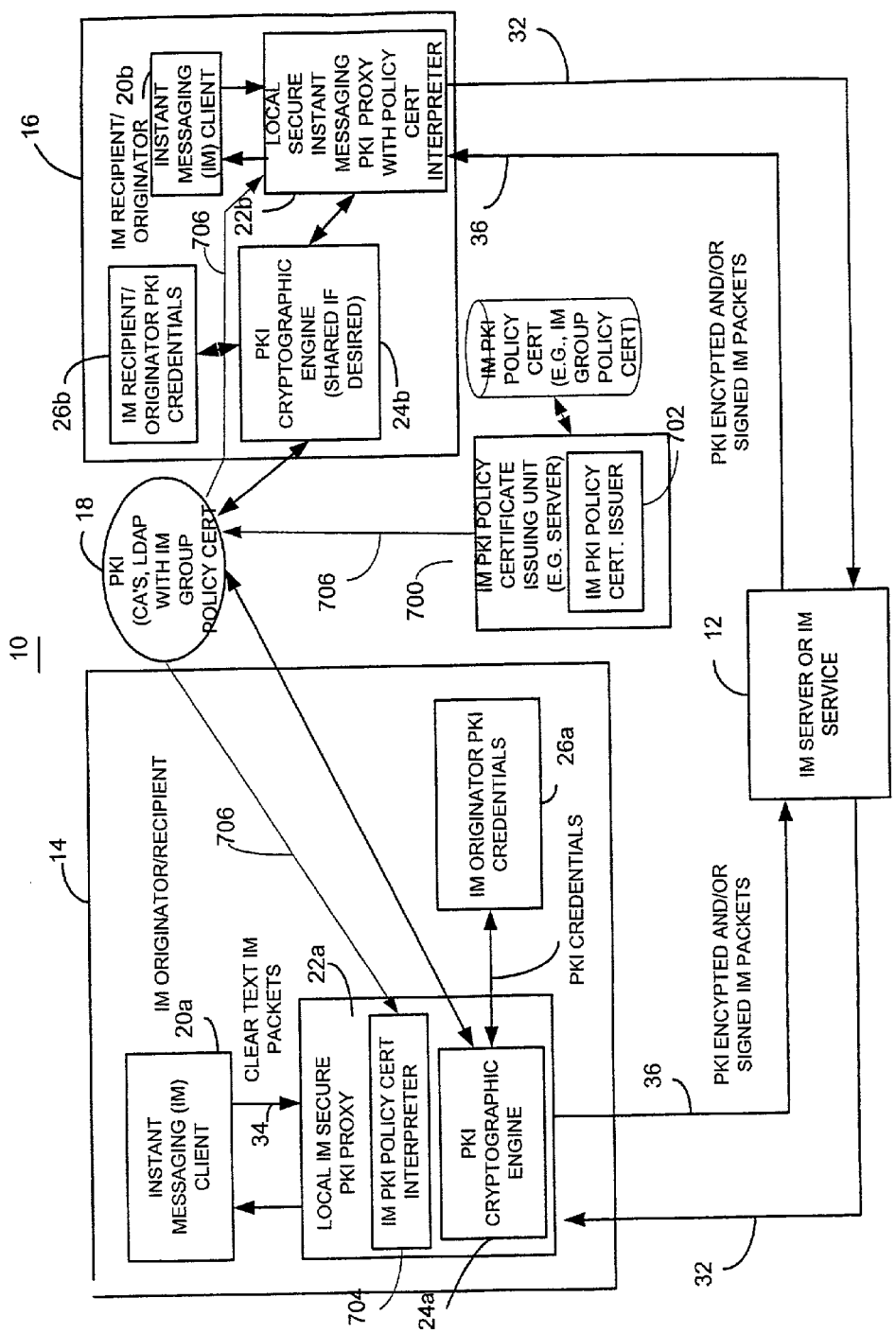
FIG. 7 is a block diagram illustrating one example of a secure instant messaging system that employs an instant messaging PKI policy certificate issuing unit in accordance with one embodiment of the invention.

FIG. 7 is a block diagram illustrating another embodiment of an instant messaging system 10. In this embodiment, the instant messaging system 10 includes an instant messaging PKI policy certificate issuing unit 700 which contains an instant messaging PKI policy certificate issuer 702. Each local instant messaging secure PKI proxy 22a and 22b further includes an instant messaging PKI policy certificate interpreter 704. The instant messaging PKI policy certificate issuing unit 700 may be, for example, a server or other suitable device operably coupled to the PKI 18 and/or the instant messaging devices. The server may include one or more processing devices (examples given above) that execute instructions from memory (examples given above) to carry out the operations described herein. Alternatively, discrete logic circuits may also be used. The local instant messaging secure PKI proxy 22a receives the instant messaging public key cryptography policy certificate 706 from the PKI 18 after it has been issued. The instant messaging public key cryptography policy certificate 706 may be any suitable data structure including an attribute certificate as defined, for example, in International Telecommunication Union (ITU-T) Recommendation X.509, 06/97. Hence, the instant messaging public key cryptography policy certificate 706 includes instant messaging policy control data (see FIG. 9) which controls the operations of the instant messaging secure PKI proxy 22a. Examples of policies include cryptographic and non-cryptographic policies such as instant messaging communication controls such as which buddies a particular instant messaging originator may communicate with, the type of encryption algorithm to be used by the PKI cryptographic engine, and other policies as further described below.

Figure 8:
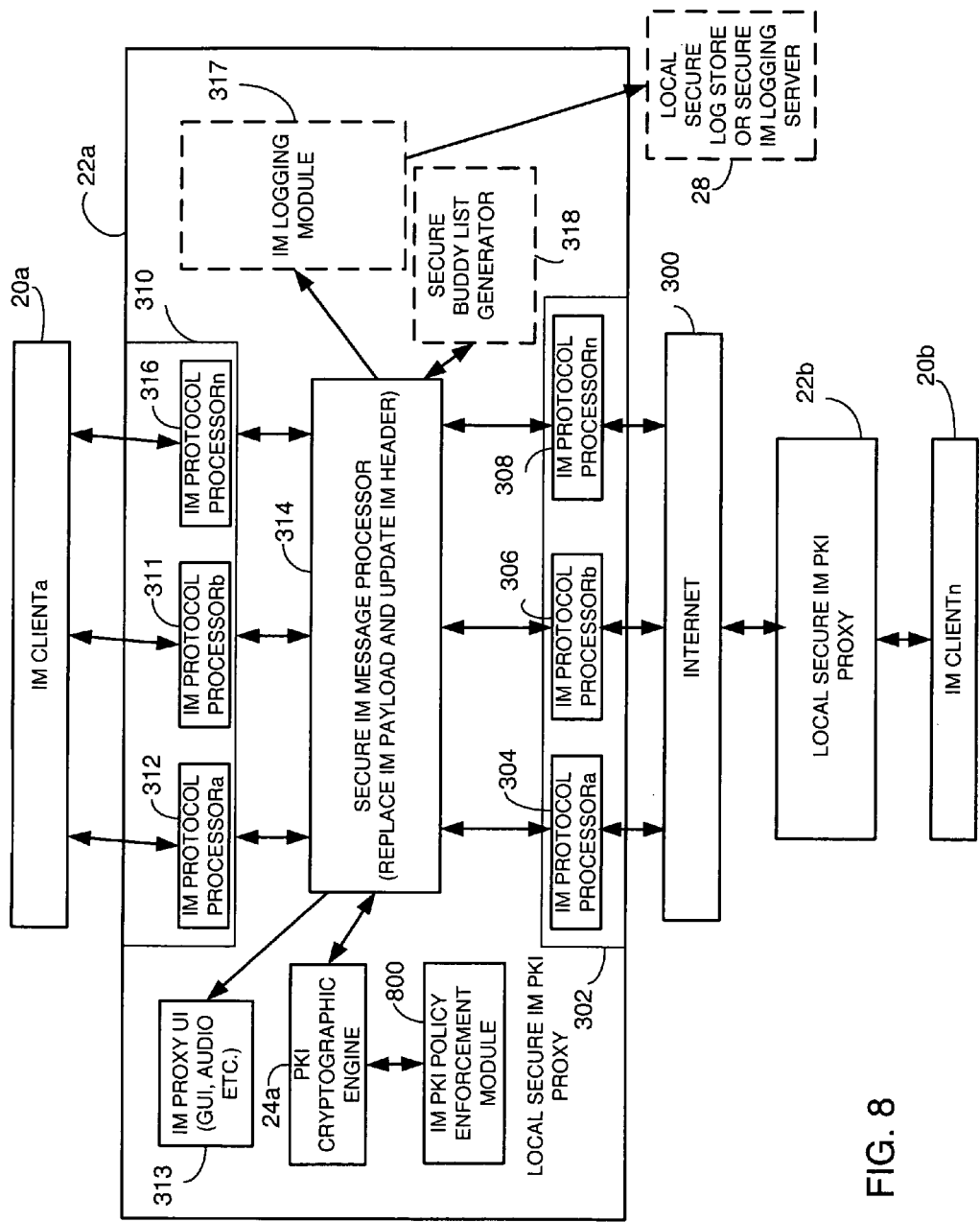
FIG. 8 is a block diagram illustrating one example of an instant messaging secure PKI proxy that is controlled using an instant messaging PKI policy certificate in accordance with one embodiment of the invention.

As shown in FIG. 8, the local instant messaging secure PKI proxy 22a includes an instant messaging PKI policy enforcement module 800 which may be a suitable software module which is operably coupled with the PKI cryptographic engine 24a and the secure instant messaging message processor 314. The instant messaging PKI policy enforcement module 800 provides the requisite settings for the PKI cryptographic engine 24a based on instant messaging policy control data set forth in the instant messaging public key cryptography policy certificate 706. The instant messaging PKI policy enforcement module 800 may communicate to the secure instant message processor 314 other settings for the instant messaging protocol processors or any other desired operations.

Figure 9:
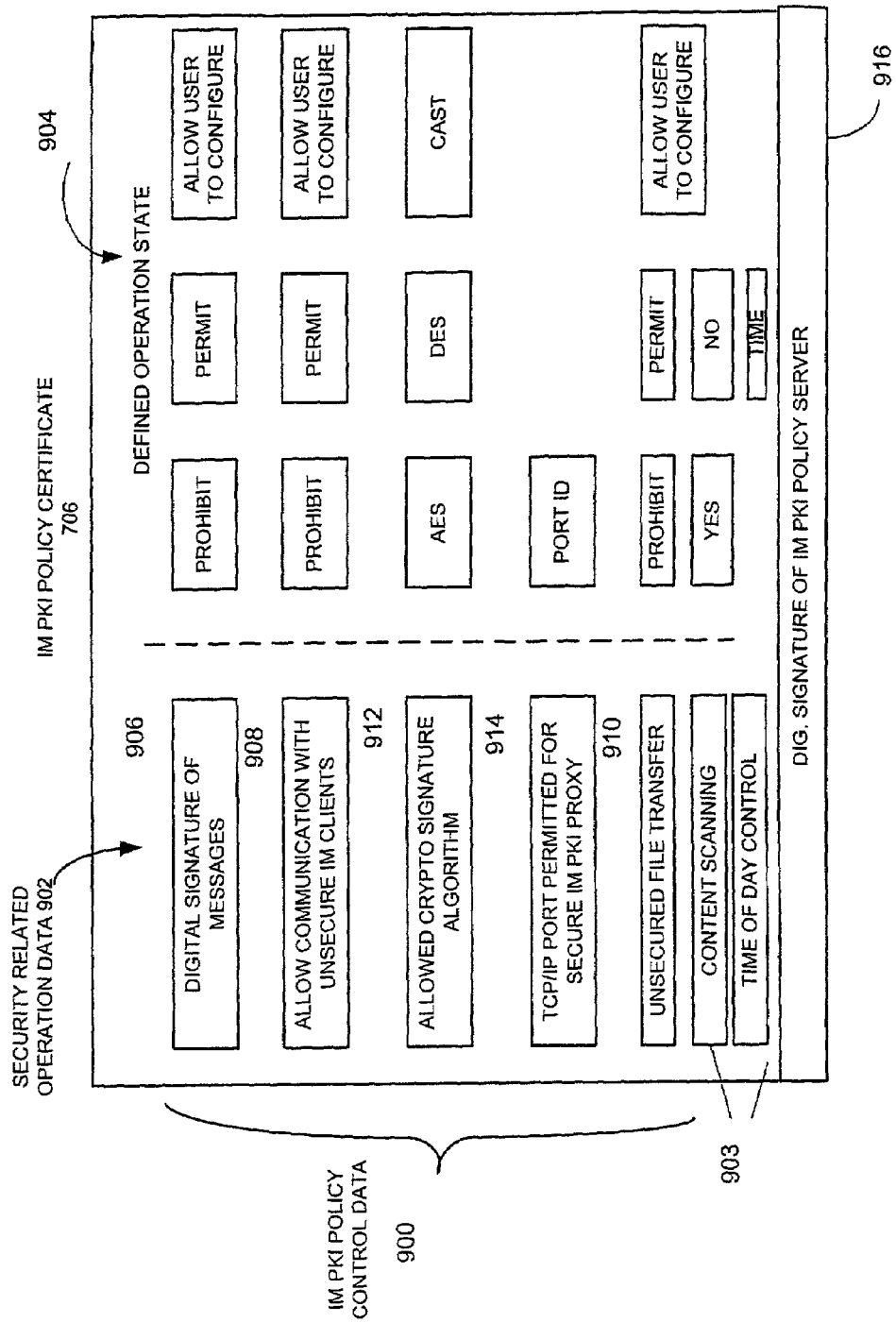
FIG. 9 is a diagram illustrating one example of an instant messaging PKI policy certificate in accordance with one embodiment of the invention.

FIG. 9 diagrammatically illustrates one example of an instant messaging PKI policy certificate 706. For purposes of simplicity, it will be understood that the instant messaging PKI policy certificate 706 includes conventional certificate data in addition to the new instant messaging PKI policy control data described herein. For example, though not shown, an issuance date and validity period may be set forth in the instant messaging PKI policy certificate 706 along with other information. In this example, the instant messaging PKI policy certificate 706 includes instant messaging PKI policy control data 900 for one or more instant messaging subscribers, which includes security and non-security related operations data 902 and 903 and data that defines a selected operation state, generally designated at 904, for each of the security related operations. It will be recognized that this is only an example and, fewer, more or different instant messaging policy control data may be used if desired. For example, one security related operation may be to allow an instant messaging originator to digitally sign instant messages as indicated by security related operation data 906. An administrator, through a graphic user interface at the instant messaging PKI policy certificate unit 700, may designate that a particular instant messaging originator may be prohibited from signing instant messages or may permit the instant messaging originator to digitally sign messages or allow the user to configure locally whether the user wishes to digitally sign instant messages. A similar defined operation state 904 may be set forth to allow communication with unsecure instant messaging clients as indicated by security related operation data 908, allow unsecure file transfers as indicated by security related operation data 910 or any other suitable security related operations. Other examples shown include allowing or setting a public key cryptographic signature algorithm as shown by security related operation data 912 to one of CAST, DES or AES, or any other suitable cryptographic signature algorithm. In addition, the security related operation data 902 may indicate the TCP port permitted for the secure instant messaging PKI proxy as shown by security related operation data 914. The instant messaging PKI policy certificate 706 includes the digital signature 916 of the instant messaging PKI policy server and therefore is a trusted instant messaging policy enforcement mechanism.

Figure 10:
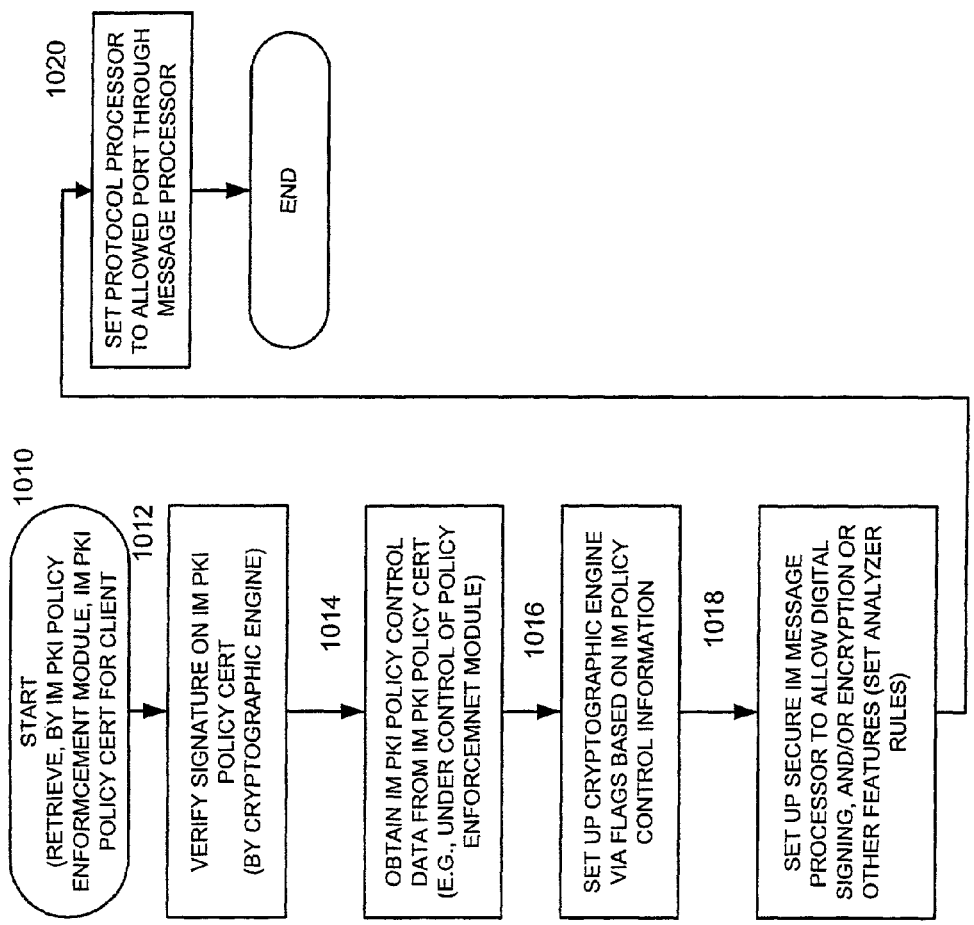
FIG. 10 is a flow chart illustrating an example of a method for facilitating secure instant messaging in accordance with one embodiment of the invention.

As shown in FIG. 10, in operation, after an administrator selects, such as through a user interface, suitable instant messaging policy control data for one or more instant messaging subscribers, and the instant messaging PKI policy certificate issuing unit issues the instant messaging public key cryptography public policy certificates, the local instant messaging secure PKI proxy, through the instant messaging PKI enforcement module, retrieves the instant messaging public key cryptography certificate, for example, based on a buddy ID which is used to index the policy certificates in an LDAP directory, X.500 directory, or any other suitable directory. Also, it could retrieve the certificate from a local cache which can be updated periodically via a push operation from the certificate issuing unit or PKI. This is shown in block 1010.

As shown in block 1012, the method includes verifying the digital signature on the instant messaging PKI policy certificate, such as by the PKI cryptographic engine 24a. This is done to determine if it was originated by a trusted instant messaging PKI policy certificate issuer. If properly verified, as shown in block 1014, the method includes obtaining the instant messaging PKI policy control data from the instant messaging PKI policy certificate, such as through the policy enforcement module and using the policy control data 900 in the instant messaging public key cryptography policy certificate to control the local instant messaging secure PKI proxy 22a. For example, as shown in block 1016, the method includes setting up the cryptographic engine 24a using for example flags based on instant messaging policy control data 900 set forth in the instant messaging policy certificate 706. In addition, as shown in block 1018, the method includes setting up the secure instant message processor 314 to allow digital signing and/or encryption or other features and as such sets the rules by which the secure instant message processor 314 (e.g. header and payload information) analyzes incoming and outgoing instant messages. As shown in block 1020, the method also includes setting the protocol processors 304-308 and 312-316 to the defined port as set forth, for example, in the instant messaging policy certificate 706. This may be done, for example, through the secure instant message processor.

Preferably, at each request to initiate an instant messaging conversation (or any other suitable time including multiple times per session), the instant messaging client 20a, or instant messaging secure PKI proxy, retrieves (from local cache, directory or other source such as a retrieval service) the instant messaging policy certificate to ensure that the requested connection is permitted. As part of this process, the digital signature on the certificate is verified and any revocation list or mechanisms are checked to ensure that the policy certificate has not been revoked. Preferably, the same policy certificate is used for a plurality of instant messaging originators and instant messaging recipients.

To create instant messaging policy certificates, the instant messaging PKI policy certificate issuer 700 presents an administrator with a user interface, such as a GUI, with selectable instant messaging policy control data on a per subscriber or per buddy group basis and hence provides selectability of instant messaging public key cryptography policy control information. The instant messaging PKI policy certificate issuer 700 generates (e.g., issues) an instant messaging public key cryptography policy certificate 706 containing selected instant messaging public key cryptography policy control information. Once selected, the instant messaging PKI policy certificate issuer 700 stores issues (signs and/or publishes) the instant messaging PKI policy certificate and stores a copy in a local database if desired and publishes it to a suitable directory or can send it directly to an instant messaging device. Administrators create the instant messaging policy certificates and are created as noted above at a central point and published to a repository or broadcast to active instant messaging subscribers if desired. As operating conditions change, a new instant messaging PKI policy certificate is published. At the option of the administrator, all active instant messaging devices may be notified that a new certificate is available. Local instant messaging PKI proxies are then obligated to immediately apply the new policy rules to all operations.

Figure 11:
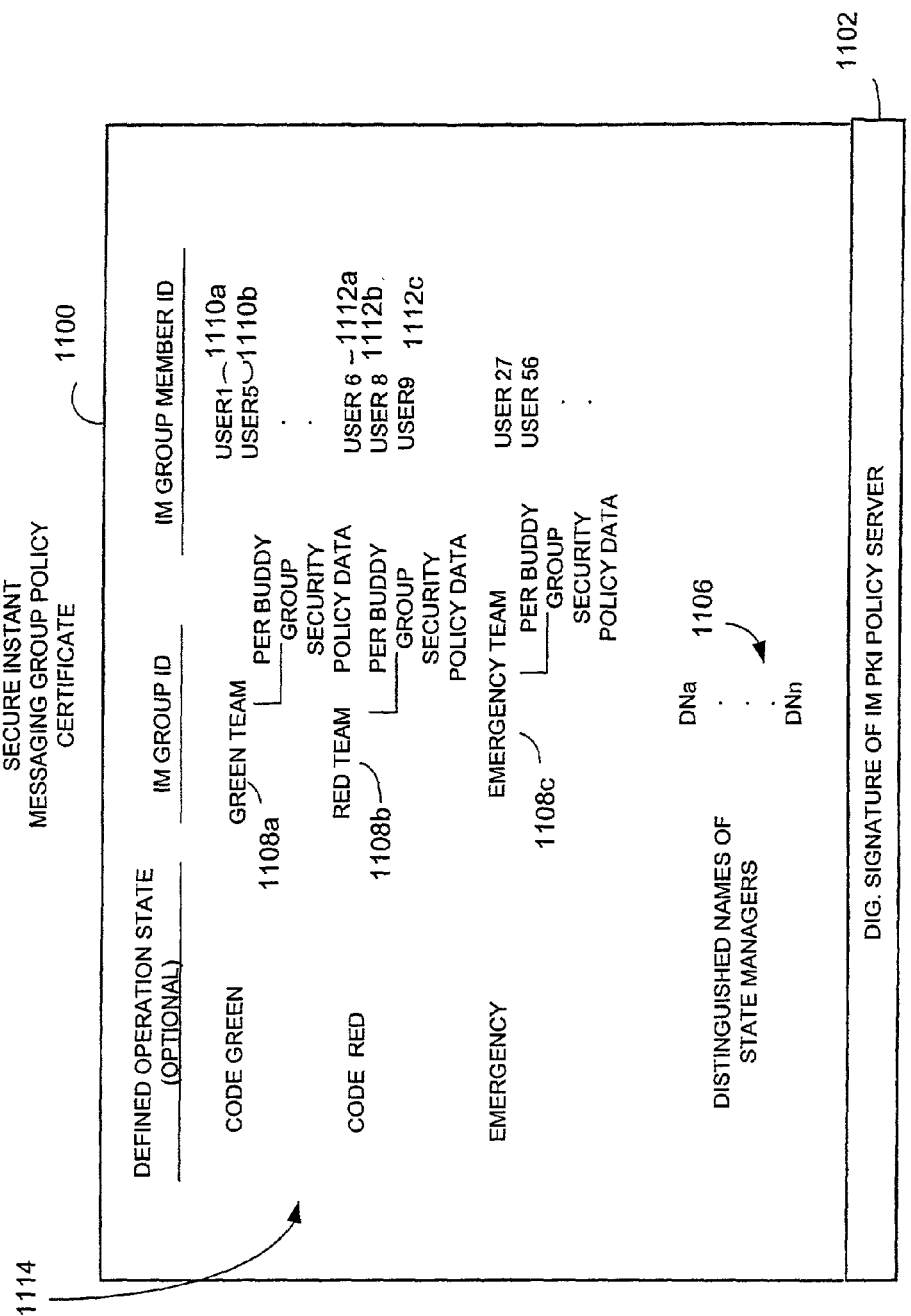
FIG. 11 is a diagram illustrating one example of an instant messaging group policy certificate in accordance with one embodiment of the invention.

FIG. 11 illustrates one example of an instant messaging group policy certificate 1100 which is digitally signed by the instant message public key infrastructure policy certificate issuing unit or any other suitable trusted authority as shown by digital signature 1102. The instant messaging group policy certificate 1100 includes the distinguished name or other identifier of state managers indicated as identifier 1106 of one or more authorized state managers. As set forth below, a state manager is a person or entity authorized to issue secure instant message state change notifications to modify group operations through the change in operation of the secure instant message public key infrastructure proxy.

The secure instant messaging group policy certificate 1100 defines a plurality of instant messaging groups through instant messaging group identifiers 1108A-C and each messaging group identifier is associated with a plurality of instant messaging group member identifiers 1110A-1110B, 1112A-1112C and so on. As such, the "green team" includes user 1 and user 5 whereas the emergency team has as its group members user 27 and user 56. Each group may have per buddy group security policy data also embedded in the secure messaging group policy certificate containing data described above. In this way, one group policy certificate may control a plurality of different groups of instant messaging subscribers. Hence, the exclusive groups of instant messaging subscribers will communicate securely with one another. For example, if an emergency is declared in a specific geographic area, a group certificate can be issued that lists all the personnel that would constitute an emergency response group. Individual and group conversations may only be established with other members of the group. Other instant messaging subscribers will be denied access to the respective instant messaging subscriber. Group policy certificates can be changed dynamically by state managers, therefore, group membership may be modified as appropriate. Each group policy certificate may reference both users and/or roles establishing conversations with personnel unknown to some participants.

The secure instant messaging group policy certificate 1100 may also optionally include defined operation states, designated 1114. In this example, an operational state such as code green has instant messaging group identifier 1108A designated as the green team where the green team includes group member identifiers associated with user 1 and user 5. User 1 and user 5 correspond to instant messaging subscribers or instant messaging originators.

Figure 12:
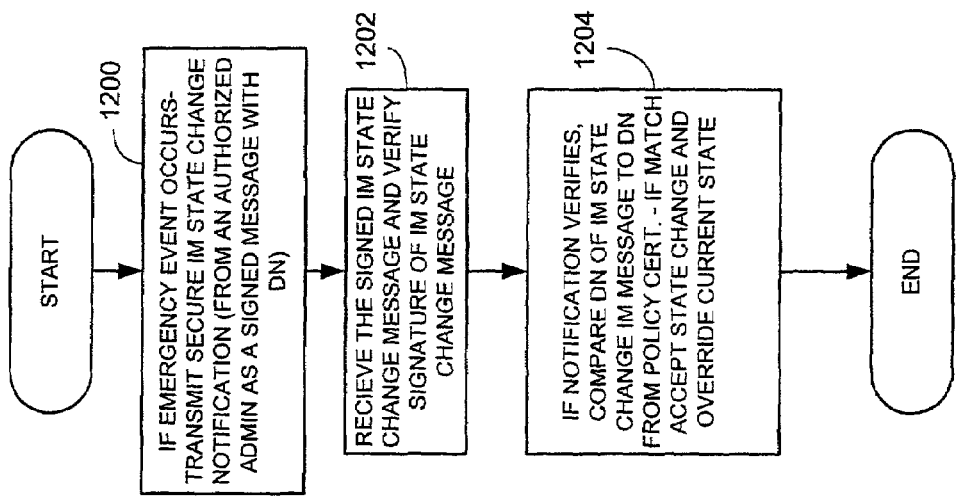
FIG. 12 is a flow chart illustrating one example of a method for facilitating instant messaging utilizing an instant messaging group policy certificate in accordance with one embodiment of the invention.

Referring to FIG. 12, in operation, an instant messaging device receives, such as through the local instant message secure public key infrastructure proxy, a secure instant messaging group policy certificate 1100 issued by the instant messaging public key infrastructure policy certificate issuing unit 700. The instant message public key infrastructure secure proxy communicates the instant message from one instant messaging group member to another instant messaging group member that is identified in the secure instant messaging group policy certificate. For example, taking the green team as an example, user 1 in sending a message sends the message to all members of the instant messaging group using the instant messaging group member IDs. No other instant messaging originators will be able to display the messages since their respective instant message secure public key infrastructure proxies will prohibit passing of the information unless their group member ID is located in the group member list. As such, only buddies designated by the secure instant messaging group policy certificate can communicate instant messages among themselves.

As shown in block 1200, if an emergency event occurs or if some other event occurs, a state manager generates a secure instant message state change notification. A secure instant message state change notification may be in the form of a digitally signed instant message containing an identifier associated with a state change manager (e.g., its DN) and data representing the state to change to such as "emergency" and is digitally signed with a private signing key associated with a state change manager. For example, a state change manager may issue a secure instant message state notification containing the defined operation state to be "emergency" as opposed to "code green." As such, the secure instant message state change notifications may be broadcast to all instant messaging subscribers identified as a member of the emergency team (because the state manager has a copy of the group policy certificate) or the state change notification may be broadcast to all online instant messaging devices. This is shown for example in block 1202. As shown in block 1204, the method includes a respective instant message originator or recipient verifying the secure instant message state change notification by performing digital signature verification thereon. In addition, the identifier associated with the state change notification that was sent is compared to an identifier, such as a distinguished name, stored locally based on a previously received secure instant messaging group policy certificate, to determine whether a group instant messaging state change is authorized. If the identifiers match, the local instant message public key infrastructure proxy will execute the state change.

To restrict instant messaging from passing through to instant messaging devices who are not considered members of a group, each instant message public key infrastructure proxy evaluates for example the "to" or "from" fields of an instant message to see if these fields match group number IDs stored in memory as obtained from previously received instant messaging group policy certificates. If the message is coming to or from another member of the same group, the message is passed through to the instant message client, otherwise it is discarded or rerouted.

Figure 13:
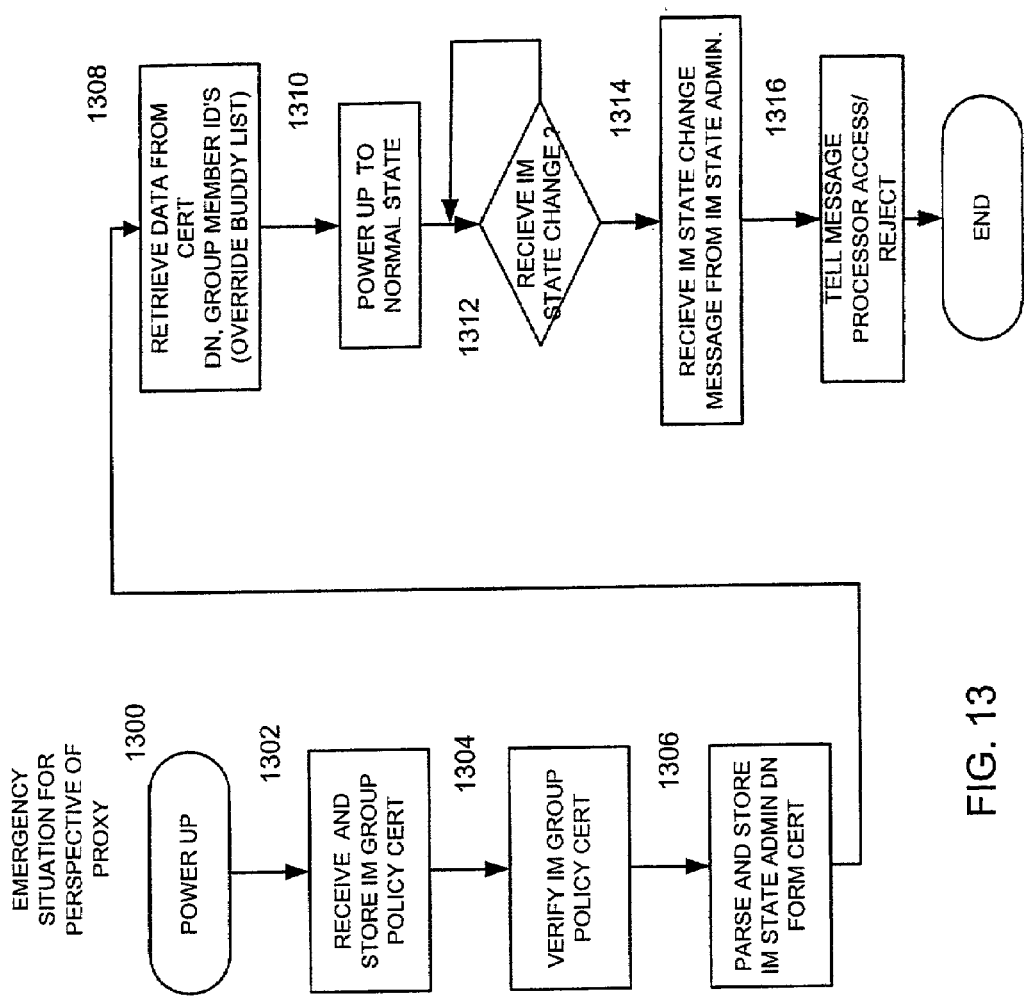
FIG. 13 is a flow chart illustrating one example of a method for facilitating instant messaging in accordance with one embodiment of the invention.

Referring to FIG. 13, a method for facilitating secure instant messaging utilizing instant messaging group policy certificates is shown. In block 1300, upon power-up of an instant messaging device, the local instant message secure public key infrastructure proxy retrieves the instant messaging group policy certificate from a suitable LDAP directory or other suitable repository, and stores the instant message group policy certificate as shown in block 1302. The instant messaging secure public key infrastructure proxy then verifies the instant message group policy certificate as shown in block 1304. If it verifies properly, the local instant message secure public key infrastructure parses and stores the instant message state administrator or distinguished name identifier from the certificate as shown in block 1306. As shown in block 1308, the method includes retrieving data from the group policy certificate, such as the distinguished name of group members or the instant message group member IDs to serve as a new buddy list. However, this is not a conventional buddy list since the members may be communicated to in a broadcast fashion if desired at the same time. Alternatively, the group members may be those members from which you can select communication.

As shown in block 1310, the method includes then powering up into a normal state of operation. As shown in block 1312, the method includes determining whether a secure instant message state change notification has been received. If one has been received, it is stored as shown in block 1314 and then analyzed as previously described to indicate whether a change in state should occur. As shown in block 1316, the group instant message secure public key infrastructure proxy then notifies the message processor of any changes in state to effect a new state change if the secure instant message state change notification is properly verified.

Among other advantages, the above device and methods provide a central mechanism to create secure instant messaging groups and to respond dynamically and quickly to changing groupings such as may be necessary in the case of an emergency.

Since the instant messaging secure PKI proxy is a proxy, the resident IM client is basically un affected and the proxy passes through advertisement information and other information unlike replacement IM clients. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for facilitating instant messaging comprising:
   receiving a secure instant messaging group policy certificate issued by a instant messaging public key infrastructure (PKI) policy certificate issuing unit wherein the secure instant messaging group policy certificate includes data identifying at least instant messaging group members; and
   communicating an instant message from one instant messaging group member to at least another group member based on the data identifying instant messaging group members from the secure instant messaging group policy certificate.

2. The method of claim 1 wherein the secure instant messaging group policy certificate includes an identifier of an authorized state manager that can authorize a change in operation of a secure instant messaging public key infrastructure proxy.

3. The method of claim 1 including the step of restricting instant messaging communications between instant messaging clients such that only buddies designated by the secure instant messaging group policy certificate can communicate instant messages among themselves.

4. The method of claim 3 including the step of broadcasting the secure instant messaging group policy certificate to instant messaging group members identified in the secure instant messaging group policy certificate.

5. The method of claim 1 including the step of issuing the secure instant messaging group policy certificate in response to an emergency event.

6. The method of claim 1 including the steps of:
   receiving a secure instant message state change notification in the form of a digitally signed instant message containing an identifier associated with a state change manager; and
   comparing the identifier associated with the state change notification to a distinguished name identifier stored from the secure instant messaging group policy certificate to determine whether a group instant messaging state change is authorized; and
   if so, executing the state change.

7. The method of claim 6 wherein the secure instant messaging public key infrastructure proxy performs the steps of receiving and comparing.

8. The method of claim 1 wherein the secure instant messaging group policy certificate defines a plurality of different instant messaging groups each identified by an instant messaging group identifier and wherein each instant messaging group identifier is associated with a plurality of instant message group member identifiers.

9. An instant messaging device comprising:
   at least one processor; and
   memory, operatively coupled to the at least one processor, containing instructions that when executed by one or more processors causes the one or more processors to:
   receive a secure instant messaging group policy certificate issued by a instant messaging public key infrastructure (PKI) policy certificate issuing unit wherein the secure instant messaging group policy certificate includes data identifying at least instant messaging group members; and
   communicate an instant message from one instant messaging group member to at least another group member based on the data identifying instant messaging group members from the secure instant messaging group policy certificate.

10. The device of claim 9 wherein the secure instant messaging group policy certificate includes an identifier of an authorized state manager that can authorize a change in operation of a secure instant messaging public key infrastructure proxy.

11. The device of claim 10 wherein the memory contains instructions that when executed by one or more processors causes the one or more processors to:
   receive a secure instant message state change notification in the form of a digitally signed instant message containing an identifier associated with a state change manager; and
   compare the identifier associated with the state change notification to a distinguished name identifier stored from the secure instant messaging group policy certificate to determine whether a group instant messaging state change is authorized; and
   if so, execute the state change.

12. The device of claim 9 wherein the secure instant messaging group policy certificate defines a plurality of different instant messaging groups each identified by an instant messaging group identifier and wherein each instant messaging group identifier is associated with a plurality of instant message group member identifiers.

* * * * *